Oct. 25, 1932.  A. O. MOE  1,884,101
SORTING AND PACKING BELT
Filed Aug. 22, 1928   2 Sheets-Sheet 1

WITNESSES

INVENTOR
Andrew O. Moe
BY
ATTORNEY

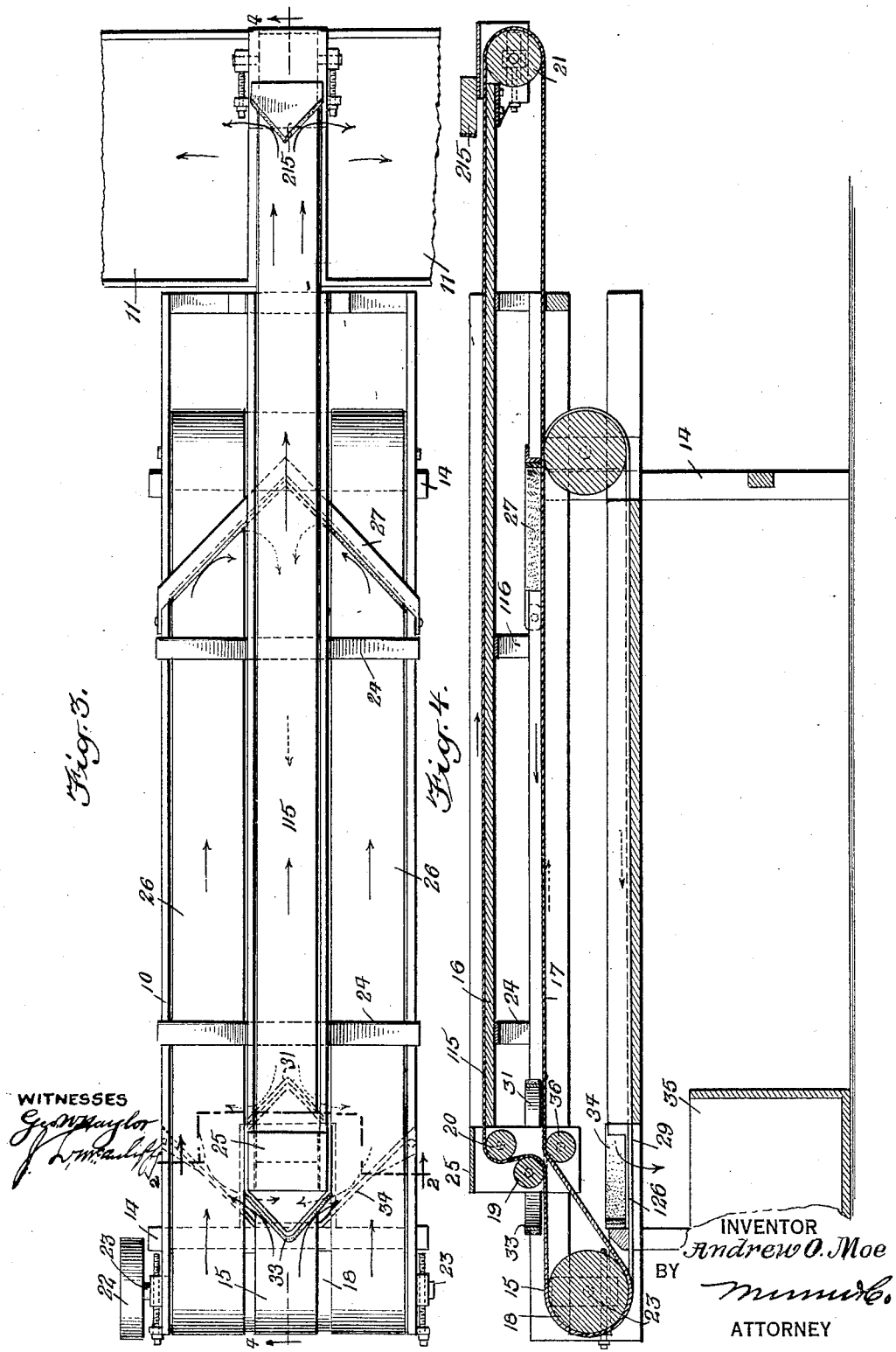

Patented Oct. 25, 1932

1,884,101

UNITED STATES PATENT OFFICE

ANDREW O. MOE, OF TOPPENISH, WASHINGTON, ASSIGNOR TO FOOD MACHINERY CORPORATION, OF SAN JOSE, CALIFORNIA

SORTING AND PACKING BELT

Application filed August 22, 1928. Serial No. 301,246.

My invention relates to what is known as a packing and sorting belt for fruits or vegetables.

The invention relates more particularly to a machine in which duplicate endless traveling belts are arranged at the sides of the machine and near which are rows of bins to receive grades A and B fruits or vegetables, and additional bins arranged at the end of the machine for receiving grade C fruits or vegetables.

The general object of the present invention is to provide for an arrangement of the third belt and appurtenances thereof whereby any fruits or vegetables which pass the sorters standing at the sides of the machine will be automatically returned to the sorters.

The nature of my invention and its distinguishing features in which the invention resides, as well as their advantages, will clearly appear as the description proceeds.

Reference is to be had to the accompanying drawings forming a part of this specification, it being understood that the drawings are merely illustrative of one example of the invention.

Figure 3 is a plan view;

Figure 4 is a longitudinal vertical section on the line 4—4 of Figure 3.

Figure 1:
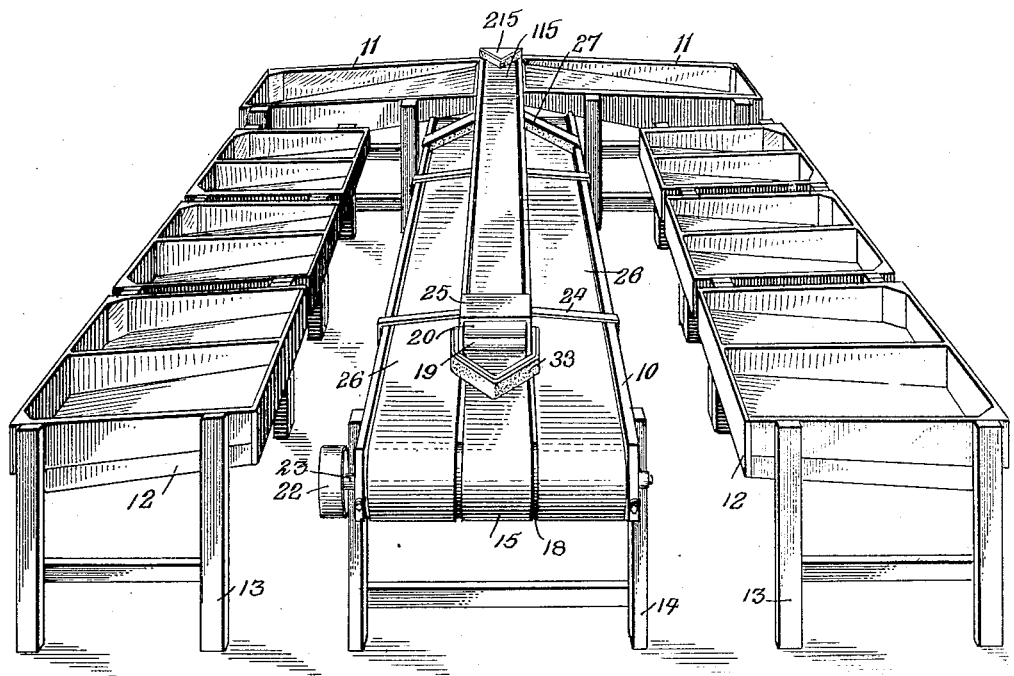
Figure 1 is a perspective view of the sorting and packing machine embodying my invention.
Figure 2:
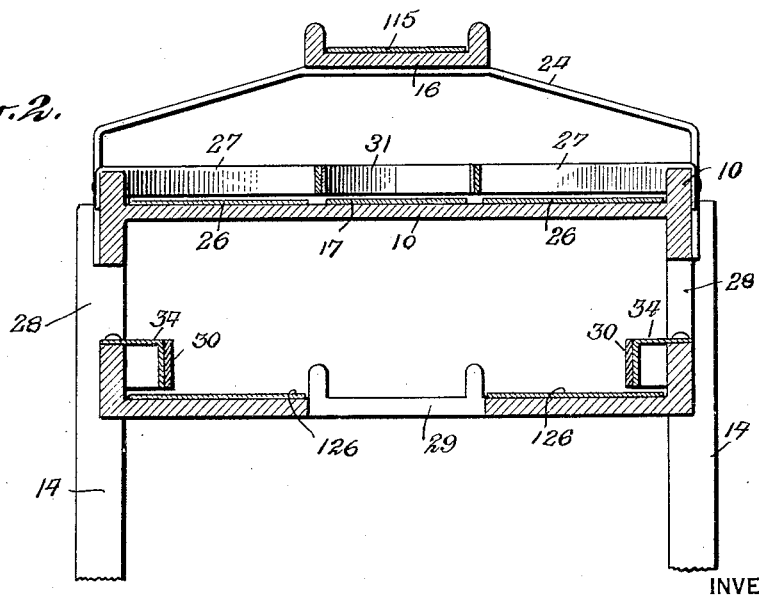
Figure 2 is a cross section on an enlarged scale on the lines 2—2 of Figure 3.

In machines to which the invention relates suitable frame work 10 is provided at that end of which opposite the feed end are laterally disposed bins 11 for the third or C grade of fruits or vegetables. The numeral 12 indicates bins at each side of the machine, said bins being here shown with supporting legs 13, the frame 10 being equipped with supporting legs 14.

Centrally of the machine is an endless belt 15 the upper lead or run 115 of which is the working run. Said working lead or run 115 carries the fruits or vegetables against a shunt 215 which directs the fruit or vegetables into the bins 11. The numeral 16 indicates a raised longitudinal table supporting the working run 115 of the central belt 15, and the numeral 17 indicates the return run of the belt.

Said belt runs over a pulley 18 at the feed end of the machine and beneath an idler 19 and thence over an idler 20 to the table 16. At the end of the machine opposite the feed end the central or C grade belt runs over an idler 21. Any suitable driving means may be adapted there being shown a drive pulley 22 on a drive shaft 23.

The table 16 is shown in the present example supported on frame arches 24 associated with which is housing 25 in the sides of which trunnions of the idlers 19 and 20 are journalled. The main sorting belts at the sides are disposed at the sides centrally of the machine and are indicated by the numeral 26.

In carrying out my present invention I provide near the far end of the machine a V-shaped shunt 27 disposed beneath the elevated table 16 and extending across both the belts 26 so that any fruits or vegetables carried by belts 26 past the sorters will contact with the oblique sides of the shunt 27 and will thereby be diverted to the return run 17 of the central belt. The arrangement results in any fruits or vegetables passing the sorters being directed to the return run 17 and are thence returned toward the feed end of the machine.

The machine to which the invention relates has a side opening 28 through which the sorters at the sides of the machine pass the culls so that the latter will be carried toward the feed end of the machines.

The numeral 34 indicates generally a shunt beneath which the return runs 126 of the belts 26 pass, whereby to direct the culls laterally as they fall onto said runs 126 after being passed through the openings 28. The shunt 34 directs the culls to a central opening 29 beneath the under run of belt 15 near the feed end of said belt.

The numeral 30 indicates pads of felt or the like on the shunt 34, it being understood that pads are provided on the other shunts, to wit, 27, 31, 33 and 215. The numeral 36 indicates an idler beneath the run 17 of belt 15 near the top idler 19.

Fruits or vegetables are dumped on the belts 15 and 26 at the feed end of the machine and any fruit on the belts 15 will contact with shunt 33 and be directed laterally to the belts 26 along the sides of which sorters stand between the said belts and the bins 12. The numeral 31 indicates a V-shaped shunt disposed near the feed end of the machine for the return lead or run 17, so that fruits or vegetables directed to the runs 17 by shunt 27 will contact with shunt 31 and be directed laterally to the belts 26 to again pass the sorters.

The invention particularly resides in the arrangement for utilizing the C grade sorting belt 15 for functioning in the return to the main sorting belt 26 of fruits or vegetables passing the sorters.

As the fruits or vegetables are dumped at the feed end of the machine adjacent to the shunt 33, said shunt will direct any fruits or vegetables falling on the belt 15 to the sorting belts 26. The sorters pick grades A and B from belts 26 and place them in the bins 12, at the same time any culls are passed through the openings 28 as is usual with such machines, and, thus, said culls are directed finally to the outlet opening 29. Any fruits or vegetables carried by the belts 26 past the sorters will contact with the shunt 27 and thereby will be directed to the return run 17 which will carry the said fruits or vegetables toward the feed end of the machine to contact with the shunt 31 and be deflected to the sorting belts 26.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. In a device of the class described, a pair of parallel endless sorting belts, an endless feed belt extending parallel to and between said sorting belts, a means disposed adjacent the forward end of travel of said belts for deflecting articles to be sorted from the sorting belts onto the return run of said feed belt, and a second means overlying the opposite end portion of the said return run for deflecting the articles back onto the sorting belts.

2. In a device of the class described, a pair of parallel endless sorting belts, an endless feed belt extending parallel to and between said sorting belts, means at one end of said feed belt for deflecting articles to be sorted onto said sorting belts, a second means toward the opposite end of said feed belt and overlying said sorting belts for deflecting articles from the latter onto the return run of the feed belt and another means overlying the return run of said feed belt toward the feed end of the device to deflect the articles back onto the sorting belts.

3. In a device of the class described, a pair of parallel endless sorting belts, an endless feed belt extending parallel to and between said sorting belts, the upper run thereof being elevated above said sorting belts and the lower run thereof being on substantially the same plane as said sorting belts, the forwardly directed end of said feed belt being extended beyond the adjacent ends of said sorting belts, bins at the opposite sides of the extended end of said feed belt, means overlying the upper side of said feed belt for deflecting articles therefrom and into said bins and a second means overlying the lower run of said feed belt and said sorting belts to deflect articles from said sorting belts to said feed belt to be carried back for resorting.

4. In a device of the class described, a pair of parallel endless sorting belts, an endless feed belt extending parallel to and between said sorting belts, the forwardly directed end of said feed belt being extended beyond the adjacent ends of said sorting belts, bins at the opposite sides of the extended end of said feed belt, means overlying the upper side of said feed belt for deflecting articles therefrom and into said bins, a second means at the rearwardly directed end of said feed belt for deflecting articles to be sorted onto the said sorting belts, a further means overlying the return run of said feed belt and the upper sides of said sorting belts at a point adjacent the forward ends of the latter for deflecting articles onto the same therefrom, and another means overlying the return run of said feed belt toward the feed end thereof to deflect the articles back onto said sorting belts.

5. In a device of the class described, a pair of parallel endless sorting belts, an endless feed belt extending parallel to and between said sorting belts, said feed belt having the rearwardly directed feed end of the forward run thereof disposed in the plane of the rearwardly directed ends of the upward forward runs of said sorting belts and the remainder of its length in a plane above the latter whereby the return run of the same will be disposed in the plane of the upper forward runs of the sorting belts, bins disposed at the opposite sides of the extreme forward end portion of said feed belt, means at the rearwardly directed end of the upper side of said feed belt for feeding articles to be sorted onto said sorting belts, a second means overlying the extreme forward end of said feed belt for deflecting articles from the same and into said bins, a further means overlying the return runs of said feed belt at a point adjacent the forward ends of the upper runs of said sorting belts for deflecting articles onto the same from the latter, and another means overlying the extreme rear end of the return run of said feed belt for deflecting articles from the same and back onto said sorting belts.

6. In a device of the class described, a pair of parallel endless sorting belts, an endless feed belt extending parallel to and between said sorting belts, said feed belt having the rearwardly directed feed end of the forward run thereof disposed in the plane of the rearwardly directed ends of the upward forward runs of said sorting belts and the remainder of its length in a plane above the latter whereby the return run of the same will be disposed in the plane of the upper forward runs of the sorting belts, bins disposed at the opposite sides of the extreme forward end portion of said feed belt, means at the rearwardly directed end of the upper side of said feed belt for feeding articles to be sorted onto said sorting belts, a second means overlying the extreme forward end of said feed belt for deflecting articles from the same and into said bins, a further means overlying the return runs of said feed belt at a point adjacent the forward ends of the upper runs of said sorting belts for deflecting articles onto the same from the latter, another means overlying the extreme rear end of the return run of said feed belt for deflecting articles from the same and back onto said sorting belts, and a row of sorting bins disposed in parallel relation to and at the opposite sides of each of the sorting belts.

ANDREW O. MOE.